United States Patent
Li

(10) Patent No.: US 7,612,523 B2
(45) Date of Patent: Nov. 3, 2009

(54) METHOD OF RECOVERING VOLTAGE OF A PRIMARY CELL AND ITS DEVICE

(75) Inventor: Chu-Tsai Li, Chiayi (TW)

(73) Assignee: Promore Environment & Energy Co., Ltd., Chiayi (TW)

( * ) Notice: Subject to any disclaimer, the term of this patent is extended or adjusted under 35 U.S.C. 154(b) by 130 days.

(21) Appl. No.: 11/782,947

(22) Filed: Jul. 25, 2007

(65) Prior Publication Data
US 2008/0042619 A1    Feb. 21, 2008

(30) Foreign Application Priority Data
Aug. 15, 2006    (TW) .............................. 95129826 A

(51) Int. Cl.
*H01M 6/50* (2006.01)
(52) U.S. Cl. ...................................... 320/100
(58) Field of Classification Search ................. 320/100
See application file for complete search history.

(56) References Cited
U.S. PATENT DOCUMENTS
6,242,886 B1 *  6/2001  Palanisamy et al. ......... 320/100

2007/0194755 A1 *  8/2007  Makhija et al. ............. 320/116
2007/0278990 A1 * 12/2007  Raichle et al. .............. 320/104

* cited by examiner

*Primary Examiner*—Edward Tso
*Assistant Examiner*—Ramy Ramadan
(74) *Attorney, Agent, or Firm*—Ming Chow; Sinorica, LLC

(57) ABSTRACT

A method of recovering voltage of a primary cell and its device. The method of steps of reading a cell to obtain start voltage, capacitance and number of the cells to be recovered, of imposing sine curve impulse once every 1-3 second on the positive pole of the cell(s) for stimulating chemical substance in the cell(s), of imposing sine curve impulse once every 5-7 seconds when the voltage recovery reaches 70%, of imposing sine curve impulse once every 10-12 seconds when the voltage recovery reaches more than 90%, and of changing sine curve impulse into a small stream of impulse when the voltage recovery reaches more than 99% for stabilizing the chemical substance in the cell(s). The device includes a reading circuit, a stimulating circuit, a control circuit, a control circuit and a voltage transforming and rectifying circuit.

8 Claims, 3 Drawing Sheets

METHOD OF RECOVERING VOLTAGE OF A PRIMARY CELL AND ITS DEVICE

BACKGROUND OF THE INVENTION

1. Field of the Invention

This invention relates to a technology of recovering voltage of a primary cell that has been used once. It discloses a method of recovering voltage of a primary cell which contains residual capacitance so that the primary cell can take up complete reactions of its electrolyte substance.

2. Description of the Prior Art

As information and communication industries have been growing, various electronic products, appliances and installations devices have also been widely developed and used. The power source of these electronic products and appliances largely depend on cells or batteries, which have been used more and more widely.

As to the cells and batteries, they are mostly classified into the following varieties according to their discharge characteristics.

1. A primary cell is a battery that can be used only once and cannot be charged and recharged repeatedly by supplementing transformed chemical energy. The primary cells include dry batteries, mercury batteries and alkaline batteries, etc. It is used earliest, and most widely, and those batteries being offered in the market are all belonging to this type of battery, such as button-shaped mercury batteries No. 1, 2 and 3.
2. A secondary battery can be charged and recharged repeatedly for repeating us age by recovering the active substance in the battery to its original condition so that the battery can supply electricity again. This type of batteries include a lead acid battery, a nickel cadmium battery, a nickel hydrogen battery, a secondary lithium battery, and a lithium ion battery, a polymer lithium battery, etc.
3. A fuel cell is greatly different from those two types as mentioned above, also known as a sustainable cell. It contains a negative pole and a positive pole without active substance, and only when it is supplied with active substances via an exterior system, it can discharge sustainable electric power. The positive pole consists of air or oxygen for the chemical reactions. The negative pole mainly consists of hydrogen or coal gas. The hydrogen-oxygen fuel cell belongs to this type of battery and is still under development. Limited by its large dimensions, it is mainly used for generators or spare power energy. Owing to recent technological advancement, its large size has been diminished gradually, and has come to be applied to electric vehicles.

However, most of the common primary cells are either zinc manganese cells, dry batteries, or carbon zinc batteries, with the zinc used as a positive pole and the carbon bars plus manganese dioxide being used as a negative pole, and the ammonium chloride, zinc chloride, or starch used as an electrolyte. It supplies voltage 1.5 V or so under 25° C., and was early developed and discovered by a Frenchman named C. Lechance. In spite of its early discovery, it is cheap to make, easily made, discharge itself in a very low extent, having a high weight-energy ratio (50-60 Wh/Kg) and being handy to be carried. It is still made mostly and widely as a primary cell in nowadays.

This kind of primary cell has a drawback of low power, even if it has been developed quite early, so it is impossible to be applied to electric appliances using large current. Besides, there is a problem of unstable voltage in discharge. In addition, zinc manganese dry batteries may have its start voltage having a tendency to become fluctuated because of long storage time and different property of manganese dioxide of the negative pole, generally in the scope of 1.50V-1.80V. If electrolytic manganese dioxide is used, the voltage and capacity of the cell can be enhanced owing to its purity and high activeness.

Next, it should be noted that it is considerably important to preserve zinc manganese dry batteries. Its positive pole of zinc may erode and cause self-discharge in case of storing in a very wet environment. Moreover, a good sealing of the batteries matters significantly, and water in the electrolyte may evaporate out in case of bad sealing to result in impossible discharge. On the other hand, the batteries may discharge seriously if oxygen enters them.

Mercury batteries are another primary cells, and it is an alkaline battery because electrolyte is alkaline, shaped as a button or a cylinder. Its negative pole is made of 90% zinc powder and 10% mercury, and its positive pole is made of 80-95% mercury oxide mixed with, 5-15% graphite, with electrolyte made of 35-40% potassium hydroxide. This type of batteries discharges stably, with the start voltage being extremely stable, easy to store, having high dimension-energy ratio, discharging 1.34V under 25° C., so it is applicable to hearing aids or cameras.

According to the traditional knowledge and technology, the primary cell is considered to be impossible to be charged repeatedly. So primary cells produced according to the regulations of the industrial association are non re-chargeable limited by the active substance and the principle of electrical theory. Cells have to be manufactured according to the regulations, to pass the test required by the regulations, as a primary cell cannot pass the test to become qualified unless the content released by the chemical substance in the primary cell gets to the standard quantity in a set time. At this time, the chemical substance reacts and burns completely, and the chemical substance can produce no more energy.

By the way, existing electric appliances cannot be started by voltage in the range of 1.0V-1.2V, for example, MP3 players need an average of 1.15V of a single cell to be activated, and cannot be started for playing if the cell has less than 1.15V. Then a consumer may think the cell has no more electricity, and it has to be replaced with a new one. But in fact, although the cell cannot start the electric appliance but it still has a voltage of approximately 1.15V, and the chemical substance does not completely react, not that its electricity is completely used up.

The above condition of so-called non-electricity of a cell is totally different from the condition of no electricity that electric professionals and scholars deem. Because 1.15V is not tantamount to 0V, and it is unreasonable to decide if the cell can still be charged or not, with the meter connected to the cell at 0V. Almost all of the consumers cannot use a meter to measure capacitance of a used cell, and may think the cell is of no electricity. Nevertheless, a cell of insufficient capacity and impossible to start an electric appliance is useless to a consumer.

As can be understood by the description above, theoretically, it is true that a primary cell is not re-chargeable, but it is also true that when the chemical substance of a used cell is not completely used, there is still some electric capacitance remains. There is not a product that can make a used cell with its remaining capacitance, so consumers waste cells and bucks, resulting in a mountain of waste batteries.

Therefore, it is critical issue to recover voltage of used primary cells with some capacitance remained so as to repeatedly use them by permitting the chemical substance to react completely.

SUMMARY OF THE INVENTION

The present invention provides a method of recovering the voltage of a used primary cell and a device associated therewith.

The method includes the following steps. (1) Reading starts voltage and capacitance of cells to be recovered. (2) Imposing sine curve impulse once every 1-3 seconds to stimulate chemical substance in the cells. (3) Imposing sine curve impulse once every 5-7 seconds when the voltage read from the cells recover the difference of the start voltage from the standard voltage for more than 70%. (4) Imposing sine curve impulse once every 10-12 seconds when the voltage read from the cells recover the difference of the start voltage from the standard voltage for more than 90%. (5) Change the sine curve impulse into a small stream for stabilizing the chemical substance of the cells. Meanwhile, the level of the sine curve impulse is 0.5V-1.5V higher than the standard voltage, and the testing and reading is performed during a period of non-sine curve impulse.

The device includes a reading circuit, a control circuit, a stimulating circuit and a voltage transforming and rectifying circuit. The reading circuit is connected to two poles of a cell or cells to be recovered, for obtaining the start voltage and capacitance of cell or cells. The control circuit received data from the reading circuit, and the stimulating circuit receives data from the control circuit, for imposing sine curve impulse on the positive pole of the cell or cells so that the chemical substance in the cells may be excited to permit the cell recover voltage to the standard voltage. The voltage transforming and rectifying circuit receives data from the control circuit for adjusting the level of voltage inputted in the stimulating circuit.

Moreover, the reading circuit is further connected to a temperature control circuit that is connected to two poles of the cell, for measuring the temperature of the cell during stimulating process.

Furthermore, the power source of the voltage transforming and rectifying circuit is an AC power rectified via passing through an AC-DC converter of the voltage transforming and rectifying circuit.

However, the power source of the voltage transforming and rectifying circuit can be a DC power coming through a DC-DC converter of the voltage transforming and rectifying circuit.

BRIEF DESCRIPTION OF DRAWINGS

This invention will be better understood by referring to the accompanying drawings wherein.

DETAILED DESCRIPTION OF THE PREFERRED EMBODIMENTS

Figure 1:
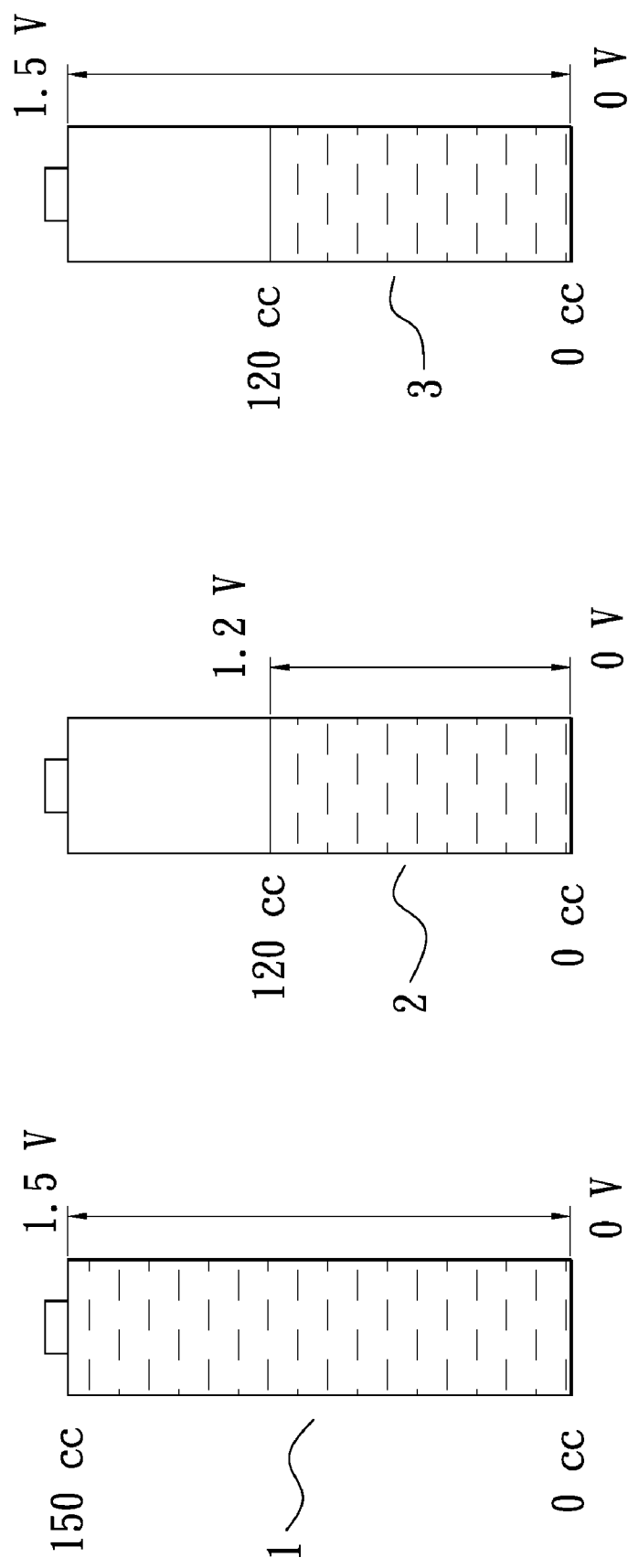
FIG. 1 is a view of mutual relation of the contents and the voltage of batteries.

The form factor of a primary cell used all over the world is as follows.

An AA (carbon) No 3 cell has a diameter 14.2 mm, a length 50 mm, voltage 1.5V, capacity 2100 mAH; an AAA (carbon) No. 4 cell has a diameter 10.5 m, a length 44.5 mm, voltage 1.5V and capacity 1000 mAH; a C (carbon) No. 2 cell has a diameter 26 mm, a length 46 mm, voltage 1.5V and capacity 7000 mAH; a D (carbon) No. 1 cell has a diameter 33 mm, a length 58 mm, voltage 1.5 mm and capacity 14000 mAH; a 9V cell has a size 48.5×26.2×17 mm, voltage 9V and capacity 550 mAH.

Electric appliances using common cells or batteries can be started by start voltage and enough current, and No. 1, No. 2, No. 3 and No. 4 cells all have the standard voltage of 1.5V, and they have different capacities to be used by different electric appliances needing different current and different usage time.

FIG. 1 shows mutual relationships of the contents and voltages of a primary cell. When a consumer cannot start an electric appliance, the person may think that the primary cell has discharged completely its electric capacitance, and will replaces it with a new battery. But practically, the primary cell used still has some remaining capacitance of reacting substance. Provided that the standard voltage of a new cell is 1.5V, and the volume of the chemical substance is 150 cc, and the voltage of the cell after used is 1.2V, then the reactive substance in the cell remains 120 cc. The present invention cannot change the volume of the chemical substance, with the remaining chemical substance being still 120 cc, but can recover the voltage of the cell to original standard 1.5V.

Figure 2:
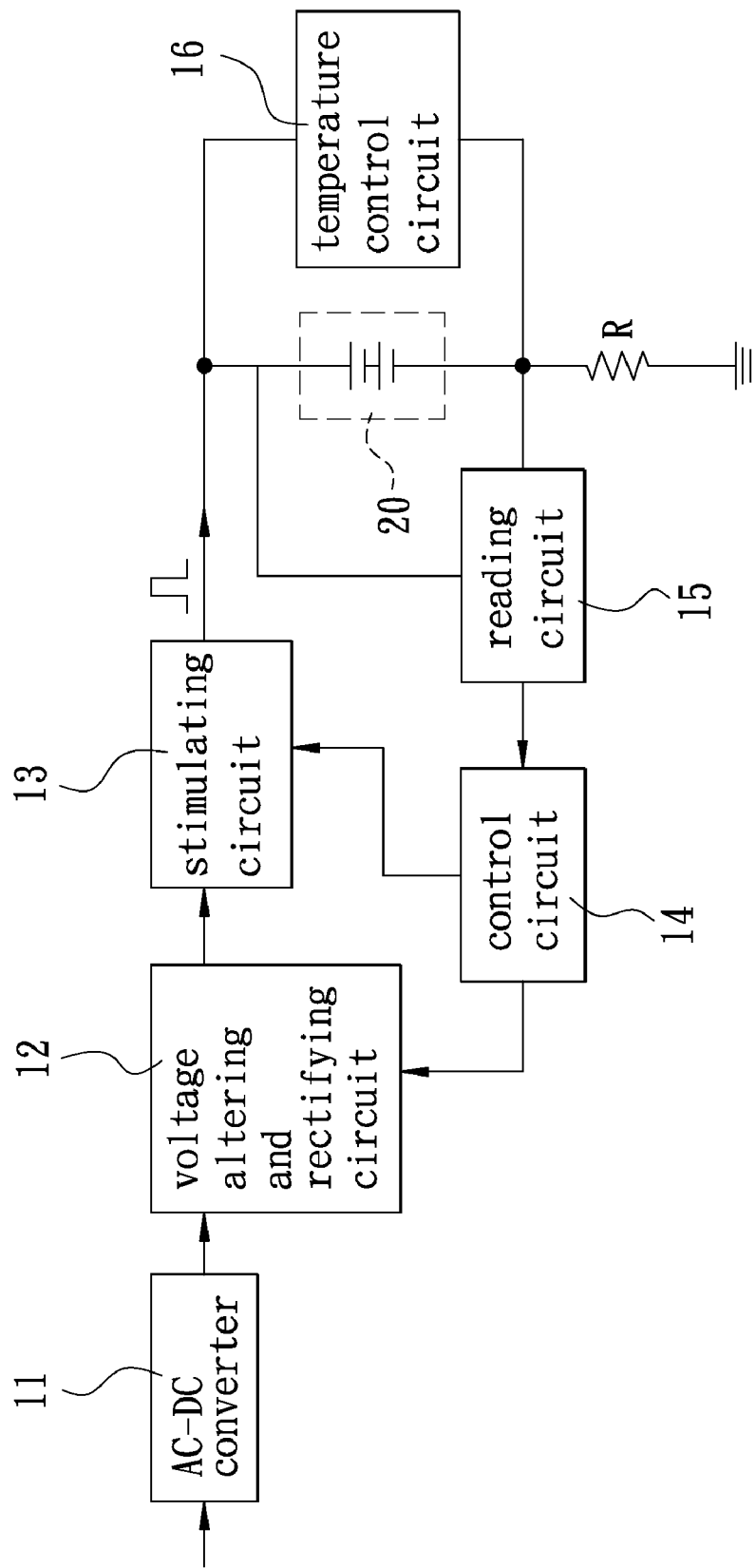
FIG. 2 is a block diagram of a device for recovering voltage of a primary cell in the present invention; and, FIG. 3 is a block diagram of another device for recovering voltage of a primary cell in the present invention

Next, FIG. 2 shows a block diagram of a first device of recovering voltage of a primary cell in the present invention. It includes a reading circuit 15, a control circuit 14, a stimulating circuit 13, and a voltage altering and rectifying circuit 12.

The reading circuit 15 is connected to two poles of a cell (or cells) 20 for obtaining the value of the start voltage and capacitance of cell (or cells) 20 to be recovered for its (or their) voltage.

The control circuit 14 is to receive data from the reading circuit 15 and then convert the data into a control data to be sent to other control circuits.

The stimulating circuit 13 is to receive the data from the control circuit 14 for imposing a sine curve impulse to the positive pole of the cell 20 so as to excite the chemical substance in the cell 20 so that the voltage of the cell 20 may be recovered to the standard voltage.

The voltage changing and rectifying circuit 12 is to receive the data from the control circuit 14 for adjusting the level of the voltage inputted from the stimulating circuit 14.

The level of the sine curve impulse is 0.5V-1.5V higher than that of the standard voltage of the cell. The reading circuit 15 is further connected to a temperature control circuit 16 that is connected to the two poles of the cell 20, for measuring the temperature of the cell 20 during stimulating process. In the course of stimulating the cell 20, when the temperature sent from the control circuit 16 to the reading circuit 15 is 50° C., the reading circuit 15 sends the data to the control circuit 14 and stops stimulating action of the stimulating circuit 13 to the cell 20 so as to ensure the safety of the cell 20 during the recovering process.

Figure 3:
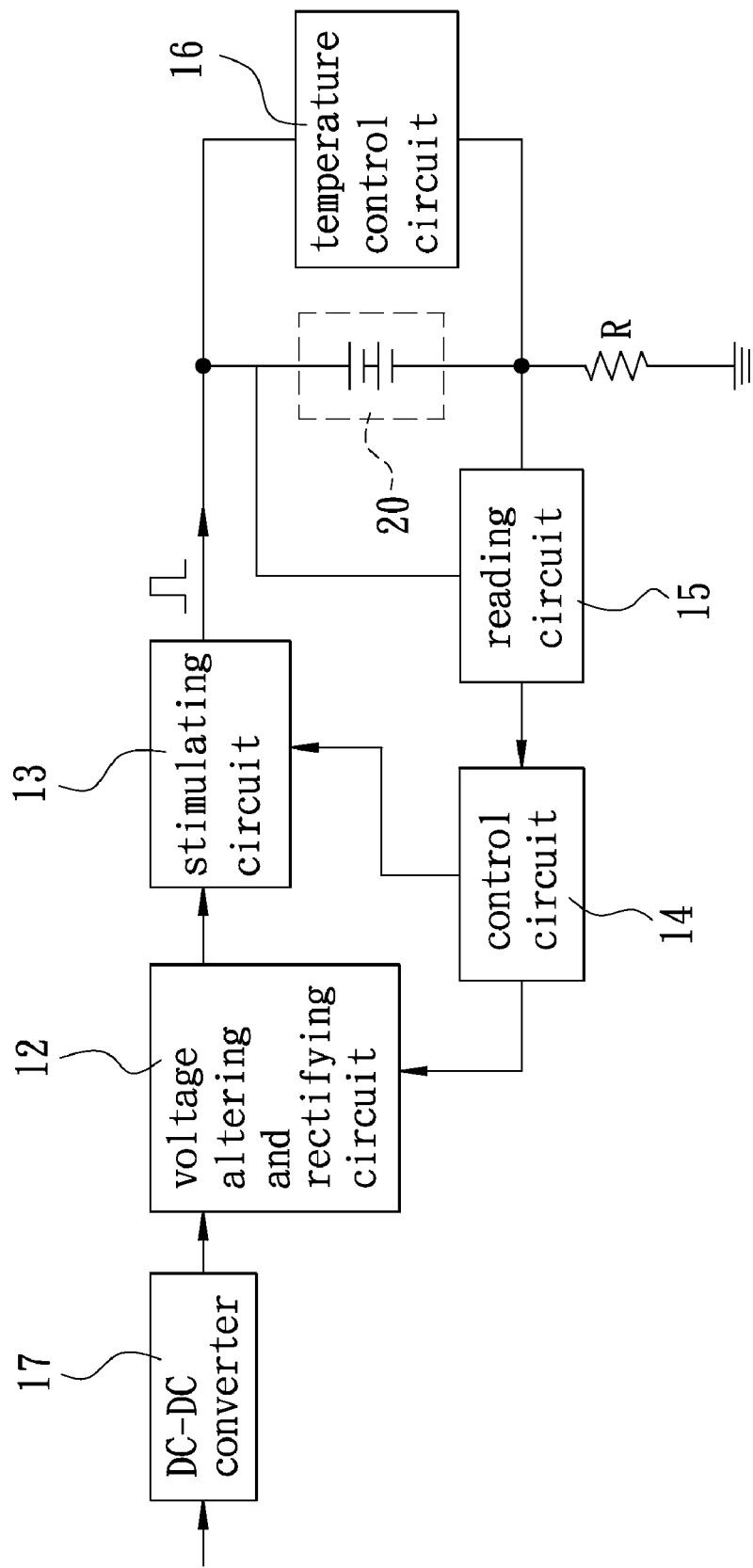

Meanwhile, the power source of the voltage changing and rectifying circuit 12 is an AC such as 100V-120V commercial power, which is rectified via the AC-DC converter 11 for supplying power needed for the device, and impulse voltage that the stimulating circuit 13 needs. However, the power source of the voltage changing and rectifying circuit 12 can be a abound DC power coming from 12V DC supplying device in a car and passing through and rectified by a DC-DC converter 17 as shown in FIG. 3 that shows a second preferred embodiment of the invention, and then the voltage recovering device in the invention can be applied to a common generator that is possible to be carried out for use.

Next, the method of recovering voltage of a primary cell according to the invention includes the following steps.

(1) A first step of reading the cells 20 by the reading circuit 15 to obtain starts voltage and capacitance of cells 20.

(2) A second step of converting the data received from the reading circuit 15 by the control circuit 14 into control data that is to be sent to the stimulating circuit 13 and the voltage changing and rectifying circuit 12, and then the stimulating circuit 13 imposes sine curve impulse once every 1-3 seconds to the positive pole of the cells 20 for exciting the chemical substance in the cells 20 so that the chemical substance may be activated. The level of the sine curve impulse is 0.5V-1.5V higher than that of the standard voltage of the cells.

(3) A third step of changing the sine curve impulse to once every 5-7 seconds when the voltage read from the cells 20 recovers its difference from the standard voltage for more than 70%.

(4) A fourth step of changing the sine curve impulse to once every 10-12 seconds when the voltage read from the cells 20 recovers its difference from the standard voltage for more than 90%.

(5) A fifth step of changing the sine curve impulse to a small stream of impulse so as to stabilize the chemical substance in the cell when the voltage read from the cells 20 recovers its difference from the standard voltage for more than 99%.

However, the test and reading in every step is performed by the reading circuit 15 during the period of non-sine curve impulse.

The object of the invention is to offer a method of recovering voltage of a primary cell and its device, for recovering voltage of a primary cell used once and its chemical substance still not totally finished reaction so that the voltage of the cell may be restored for using the complete reaction of the chemical substance in the cell.

Nowadays, discarded batteries with chemical substances such as zinc, mercury, manganese therein may affect soil and pollute water sources. It is very difficult to deal quickly with the heaps of waste batteries, which becomes the serious problem for the environment conservation. For reducing the impact to the ecological conservation, almost every country in the world advocates recycling of waste cells and batteries. In addition, owing to the convenient usage of the cell, and advanced technology to make the secondary battery that is rechargeable and used for special electronic appliances, cells and batteries are still used widely and commonly, so to deal with used cells and batteries is a chronic headache problem worldwide.

Though recycling is one method for resolving this problem, but reutilizing the remaining energy not wholly used in such products as cells and batteries is also another method. So the present invention offers this kind of solution for recovering voltage of used primary cells that consumers think they are no more usable after electric appliances cannot work with the cells. Then consumers do not need to discard them, able to use wholly the electric energy in the cells, saving some expense for them and reducing the number of waste cells and batteries to somewhat contribute to the environment conservation.

While the preferred embodiment of the invention has been described above, it will be recognized and understood that various modifications may be made therein and the appended claims are intended to cover all such modifications that may fall within the spirit and scope of the invention.

What is claimed is:

1. A device for recovering voltage of a primary cell, said device comprising:
    a reading circuit connected to two poles of a cell, for obtaining a start voltage and capacitance said cell;
    a control circuit for receiving data from said reading circuit;
    a stimulating circuit for receiving data from said control circuit, for imposing a sine curve impulse on a positive pole of said cell to excite a chemical substance in said cell and recover the voltage in said cell to a standard voltage; and
    a voltage changing and rectifying circuit for receiving data from said control circuit and to adjust a level of voltage inputted in said stimulating circuit,
    wherein said stimulating circuit imposes sine curve impulse once every 1-3 seconds for stimulating said chemical substance in said cell;
    imposing said sine curve impulse once every 5-7 seconds when the voltage read from said cell has recovered a difference of said start voltage from standard voltage for more than 70%.
    imposing said sine curve impulse once every 10-12 seconds when the voltage read from said cell has recovered a difference of said start voltage from said standard voltage for more than 90%; and,
    changing said sine curve impulse into a small stream of impulse for stabilizing said chemical substance in said cell when the voltage read from said cell has recovered a difference of said start voltage from said standard voltage for more than 99%.

2. The device as claimed in claim 1, wherein said sine curve impulse has a level 0.5V-1, 5V higher than a standard voltage of said cell.

3. The device as claimed in claim 1, wherein said reading circuit is further connected to a temperature control circuit connected to said two poles of said cell, for measuring temperature of said cell during a period of stimulating process.

4. The device as claimed in claim 1, wherein a power source of said voltage transforming and rectifying circuit is an AC power passing through an AC-DC converter of said voltage transforming and rectifying circuit.

5. The device as claimed in claim 1, wherein a power source of said voltage transforming and rectifying circuit is a DC power passing through a DC-DC converter of said voltage transforming and rectifying circuit.

6. A method of recovering voltage of a primary cell, said method comprising:
    (1) a first step of reading a primary cell, for obtaining a start voltage and a capacitance of the cell to be recovered;
    (2) a second step of imposing a sine curve impulse once every 1-3 seconds on a positive pole of said cell after the reading of said cell, in order to stimulate chemical substance in said cell;
    (3) a third step of imposing a sine curve impulse once every 5-7 seconds when a read of a start voltage from said cell has recovered a difference from a standard voltage for more than 70%;
    (4) a fourth step of imposing a sine curve impulse once every 10-12 seconds when a read of a start voltage from said cell has recovered a difference from the standard voltage for more than 90%; and
    (5) a fifth step of changing a sine curve impulse into a small stream of impulse for stabilizing said chemical substance in said cell when a read of a start voltage from said cell has recovered a difference from the standard voltage for more than 99%.

7. The method of recovering voltage of a primary cell as claimed in claim 6, wherein a level of said sine curve impulse of the fifth step is 0.5V-1.5V higher than standard voltage of said cell.

8. The method of recovering voltage of a primary cell as claimed in claim 6, wherein testing and reading are carried out during a period of non-sine curve impulse.

* * * * *